(No Model.) 3 Sheets—Sheet 1.
T. A. WEBER.
COIN OPERATED WEIGHING MACHINE.
No. 380,837. Patented Apr. 10, 1888.
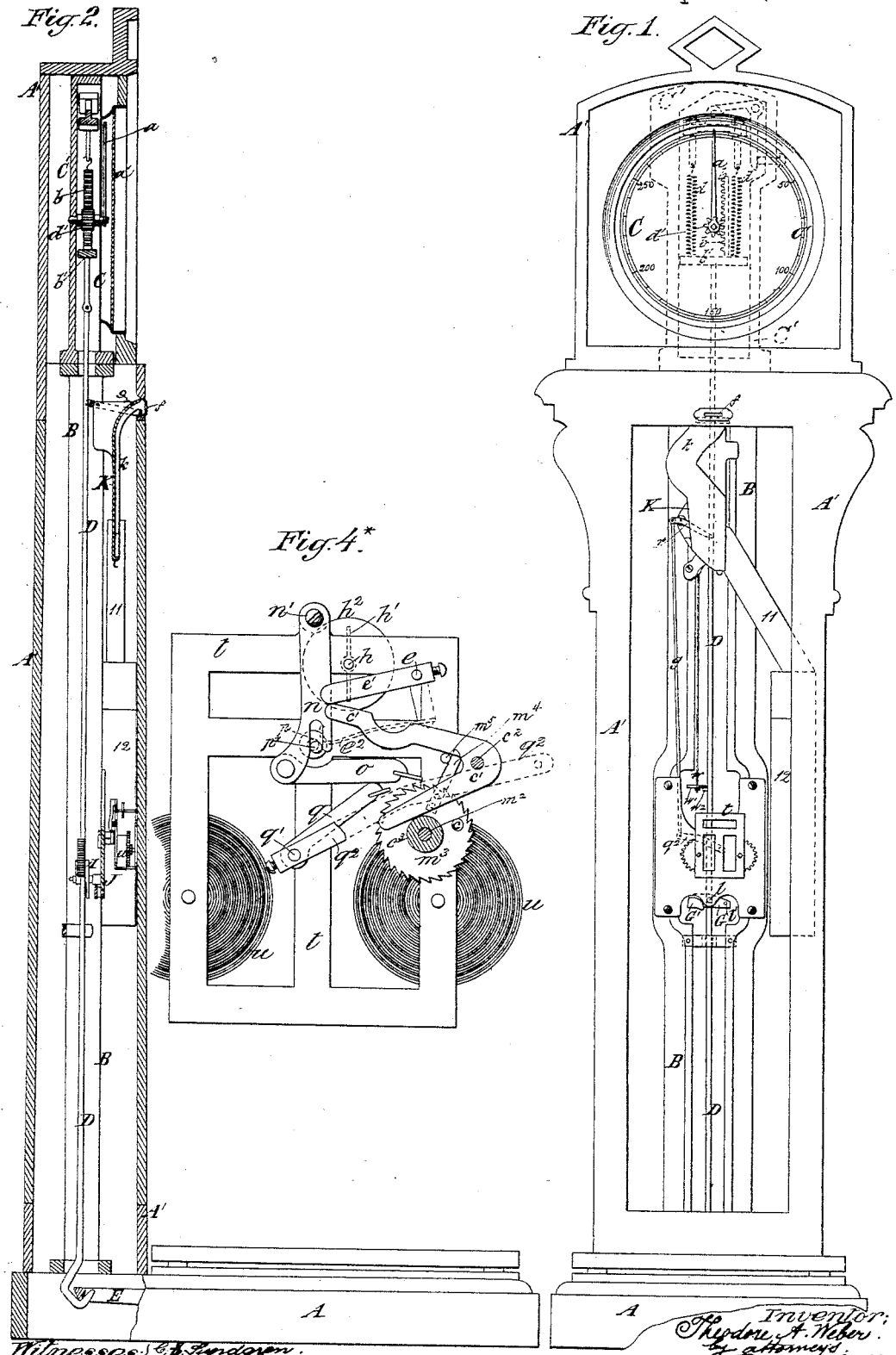

(No Model.) 3 Sheets—Sheet 2.
T. A. WEBER.
COIN OPERATED WEIGHING MACHINE.
No. 380,837. Patented Apr. 10, 1888.
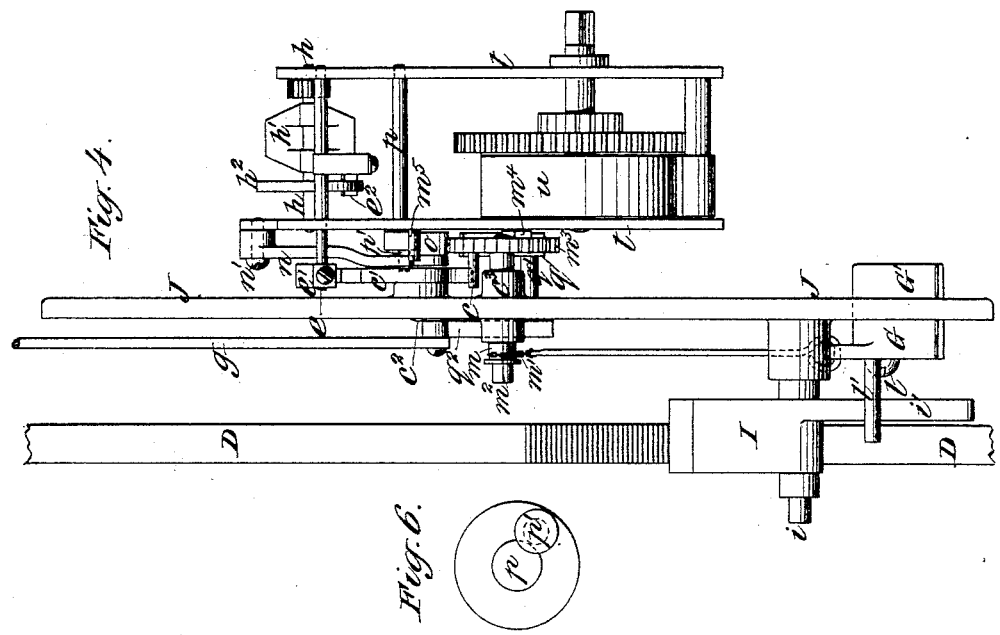
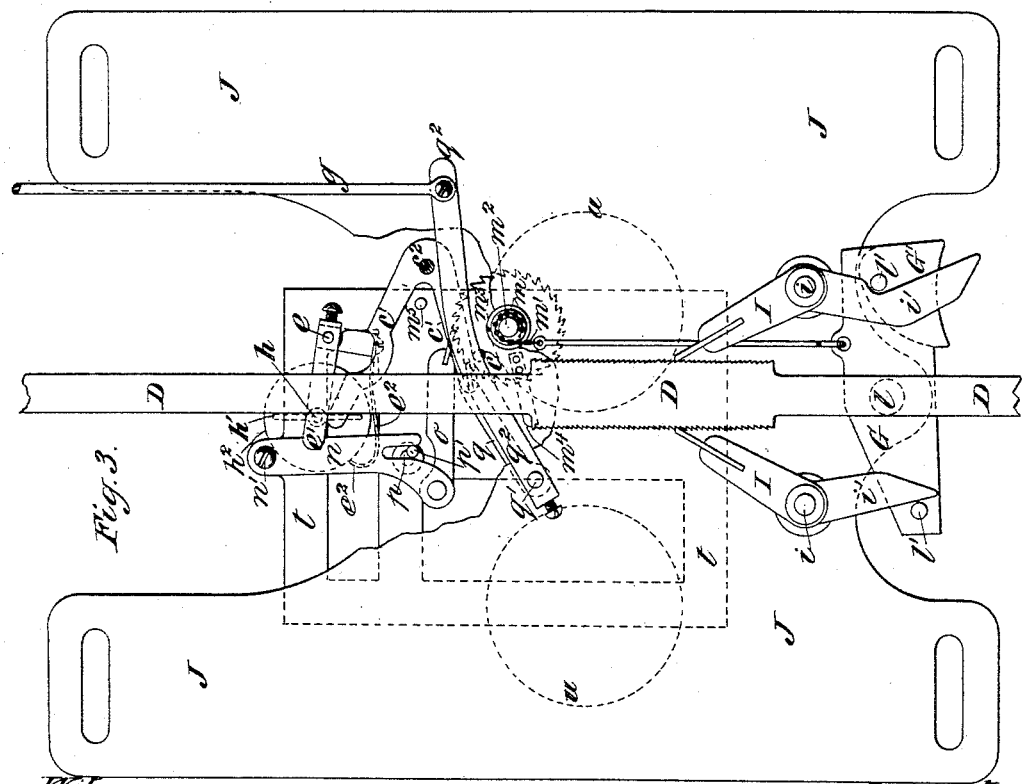
Witnesses:
C. J. Sundgren.
Joseph W. Roe.
Inventor:
Theodore A. Weber
By attorneys
Brown & Hall

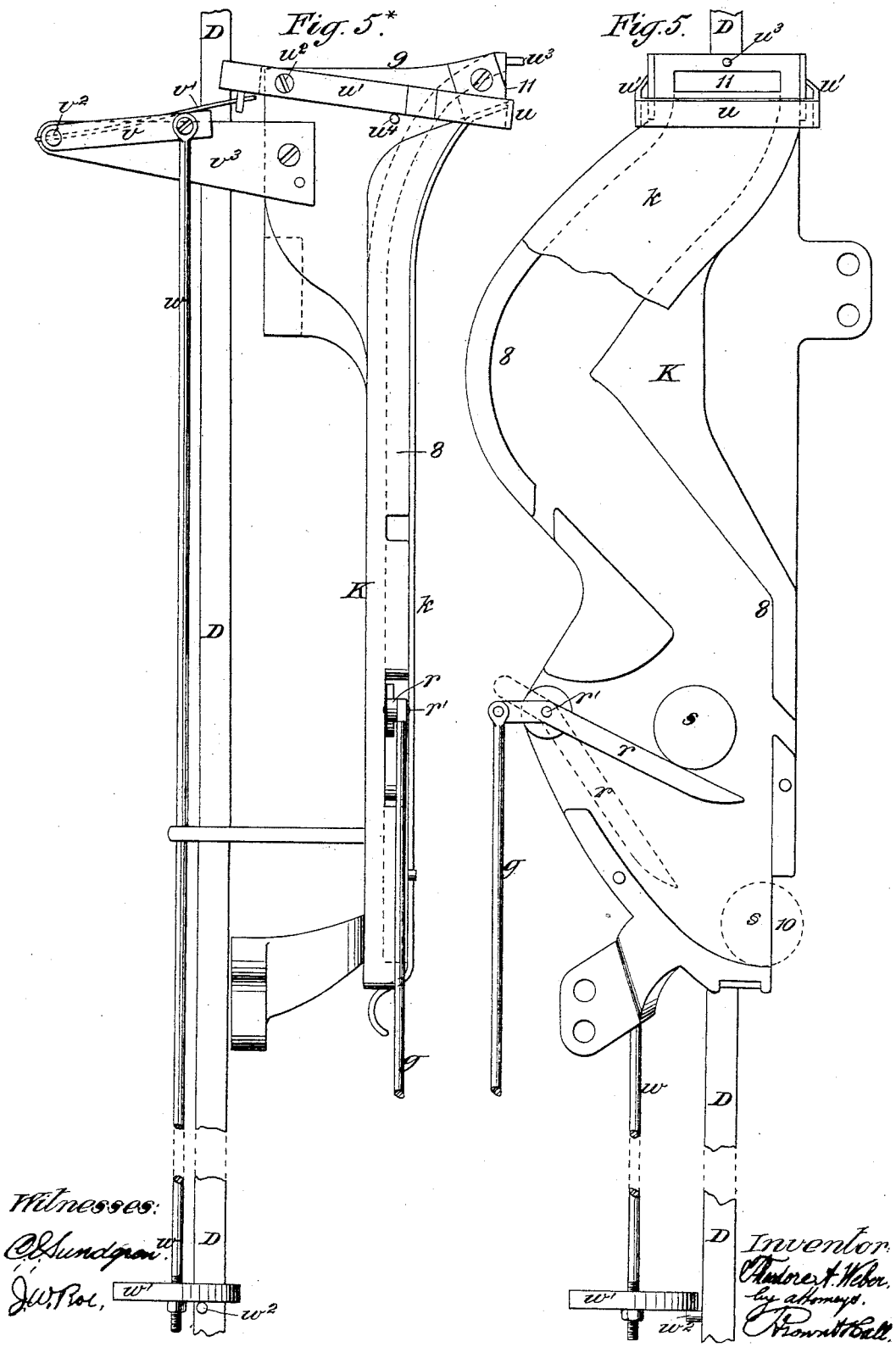

UNITED STATES PATENT OFFICE.

THEODORE A. WEBER, OF NEW YORK, N. Y., ASSIGNOR TO THE NATIONAL WEIGHING MACHINE COMPANY, OF SAME PLACE.

COIN-OPERATED WEIGHING-MACHINE.

SPECIFICATION forming part of Letters Patent No. 380,837, dated April 10, 1888.

Application filed October 11, 1887. Serial No. 251,997. (No model.)

*To all whom it may concern:*

Be it known that I, THEODORE A. WEBER, of the city and county of New York, in the State of New York, have invented a new and useful Improvement in Weighing-Machines, of which the following is a specification, reference being had to the accompanying drawings.

This invention relates to that class of weighing-machines in which when they are at rest or nothing is placed upon them to be weighed are automatically locked with the index at zero, and which require to be unlocked before weighing can be performed, such weighing-machines being generally intended to be unlocked by a coin deposited in the machine as a weighing-fee.

One object of this invention is to provide in a more simple manner both for the locking of the scale with the index at zero and for the prevention of the repetition of the weighing after the scale has been once unlocked and before its index has been again locked at zero and again unlocked.

In carrying out my invention I employ generally for arresting the connection between the platform and index at the position to which it has been brought in weighing an automatic arresting device and a motor independent of the weighing machinery for controlling the operation of said arresting device, substantially such as constitute the most essential part of my invention, which is the subject-matter of Letters Patent No. 361,246, dated April 12, 1887; but I make certain combinations, including the said arresting device and motor and the connection between the platform and index of the machine, whereby I am enabled to use the same arresting device for locking the scale at zero, thereby dispensing with a separate stop for the latter purpose, and it is in these combinations, hereinafter described and claimed, that this invention principally consists.

Figure 1 in the accompanying drawings represents a front elevation of a weighing-machine having my invention applied, the front door of the casing being omitted to expose parts of the internal mechanism to view. Fig. 2 represents an elevation at right angles to Fig. 1, mostly in section. Fig. 3 is a back view, on a larger scale, of the arresting device for locking the machine when at rest and for arresting it in the condition to which it has been brought in weighing, and the mechanism for throwing said arresting device into and out of operation. Fig. 4 is a side view corresponding with Fig. 3. Fig. 4* is a back view like Fig. 3, but having omitted from it the rod which forms the connection between the platform and index and the dogs which grip the said rod to lock the machine, and showing some of the mechanism in a position different from Fig. 3. Fig. 5 is a front view, on the same scale as Figs. 3, 4, and 4*, of the coin-duct and the device upon which the coin directly acts to produce the unlocking of the machine, the front plate being partly broken away to show the interior. Fig. 5* is a side view corresponding with Fig. 5, and showing, with the last-mentioned figure, the means of opening and closing the aperture through which the coin is introduced to the machine. Fig. 6 is a front view, on a still larger scale, of a spindle and crank, which are partly concealed in the other figures.

Similar letters of reference designate corresponding parts in all the figures.

Referring first to Figs. 1 and 2, A designates the base of the machine, and B an open column erected thereon to support the box C', which contains the indicating mechanism and has in front of it the dial C, the said column, box, and indicating mechanism being all inclosed within a case, A', which is also erected on the base A, and in front of which there is a glazed opening, a', through which the dial C and index a are visible. D designates the rod which forms the connection between the indicating mechanism and platform-lever E in the base of the scale, the upper end of the said rod being furnished with a cross-head, b', to which is attached a rack, b, gearing with a pinion, d', on the arbor of the index a, the said cross-head also having applied to it the springs d d, by which the platform and its load are counterbalanced.

As thus far described the drawings represent a well-known form of platform weighing-machine, to which, as well as to any other kind, may be applied my invention, which I will now proceed to describe in detail.

Referring next to Figs. 3 and 4, I I designate the two dogs which constitute the automatic arresting device which acts upon the rod or connection D both to lock the weighing-machine at zero and to arrest it in any position to which it is brought by the load which is weighed. These dogs resemble those described in Patent No. 361,246, hereinbefore referred to. They are arranged on opposite sides of the rod D, where they are pivoted at $i$ $i$ to the small frame J, which is bolted to the column B, and to which is secured the motor $t$ $t$ $u$ $u$, which will presently be described, and the mechanism which is employed in combination with said motor to control the operation of the said dogs. The parts of the rod with which the said dogs engage are represented in Fig. 3 as serrated to facilitate the engagement which will always take place, as shown in Fig. 3, whenever the said dogs are left free, by reason of the portions of the said dogs above the pivots being heavier than the tail-pieces $i'$ $i'$ or portions thereof below the said pivots.

G designates a lever fulcrumed to the frame J at $l$ to be operated by the motor $t$ $t$ $u$ $u$, as will be presently described, for the purpose of disengaging the dogs I I from the rod D at the time of weighing. The said disengaging-lever G is furnished with two pins or projections, $l'$ $l'$, which occupy positions outside of the tail-pieces $i'$ $i'$ of the dogs, and it is so loaded at the end G' that when it is free the said pins press against the tail-pieces $i'$ $i'$ of the dogs in such manner as to produce and maintain their disengagement from the rod. The object of the motor is to lift the loaded end of this lever G after every weighing operation, and thereby to allow the dogs I I to come into engagement with the rod D and lock the machine. This lifting operation is performed by means of its connection by a cord or chain, $m'$, with a little windlass, $m$, the axle $m^2$ of which works in a bearing in the frame J, and which is furnished with a ratchet-wheel, $m^3$, which derives motion from the motor through a pawl, $o$, as will now be explained.

The motor is represented as consisting of a small frame, $t$ $t$, containing springs $u$ $u$, like those of a clock-movement, and suitable gearing and mechanism which need only be described so far as to say that a fast-moving spindle, $p$, is furnished with a crank-wrist, $p'$, and a faster-moving spindle, $h$, is furnished with a fly, $h'$, and a friction-brake disk, $h^2$. The crank-wrist $p'$, which is shown with its spindle $p$ in Fig. 6, engages with a slot in the lower end of a lever, $n$, which hangs on a pin, $n'$, secured in the frame, and to which lever is attached the windlass operating pawl $o$, hereinbefore described. A retaining-pawl, $q$, pivoted to the frame J by a pivot, $q'$, is also applied to the said ratchet-wheel $m^3$, and to the said pivot $q'$ there is secured a lever-arm, $q^2$, which is employed to lift the said pawl and disengage the ratchet-wheel. This lever-arm $q^2$ is connected by a rod, $g$, (see Figs. 1, 3, 4, 5,) with the shorter arm of the tumbler-lever $r$, which works freely in the coin-chute K $k$ of the machine on a fulcrum-pin, $r'$, and upon the longer arm of which the weight of the coin acts to produce the liberation of the windlass $m$ from the retaining-pawl.

The ratchet-wheel $m^3$ of the windlass has rigidly attached to it an arm, $m^4$, which, when the windlass is disengaged or liberated, stops against a pin, $m^5$, fast in the motor-frame $t$ $t$, as shown in Fig. 4*, and the said ratchet-wheel has also secured in or provided on it a pin or projection, $c$, for the purpose of lifting the lower arm of an elbow-lever, $c'$, which works on a fulcrum, $c^2$, in the frame J, and the upper arm of which operates to lift the loaded lever-arm $e'$ of the friction-brake, the spindle $e$ of which works in bearings in the frame $t$ $t$, and the shoe $e^2$ of which is caused, by being thus lifted, to press upon the edge of the disk $h^2$ on the fly-spindle $h$ with sufficient force to stop the motor, this friction-stop being preferable to a more positive stop, as it will better prevent the binding of any of the mechanism, which might occur with a positive and suddenly-operating stop.

The elbow-lever $c'$, except while subject to the operation of the pin $c$ on the ratchet-wheel, rests, as shown in Fig. 4*, on a hub, $c^3$, provided on the frame J to contain the bearing of the windlass-shaft $m^2$.

The coin-chute K $k$ (see Figs. 1, 2, 5, 5*) is represented as composed of an upright grooved plate, K, having in it a groove, 8, of a depth and width sufficient for the passage of the coin, and a covering-plate, $k$, which may be attached to the said grooved plate in any way that will afford convenient access to the groove or coin-channel 8 and to the tumbler-lever $r$ therein. This plate $k$ is partly omitted in Fig. 5 to expose the interior to view. The upper part of the chute is curved forward, as shown at 9 in Figs. 2 and 5*, to bring its mouth close to the horizontal slit $f$, provided in the front of the casing A' for the insertion of the coin.

Having so far described the details of the mechanism, I will first describe the operation of weighing, first mentioning that the motor must always be kept wound.

In the normal condition of the scale—that is to say, when it is unloaded—the motor is stopped by the friction brake or stop $h^2$ $e^2$ and the windlass $m$ retained by its retaining-pawl $q$, with the cord or chain $m$ wound up, and the loaded lever G is held, as shown in Fig. 3, with its pins $l'$ $l'$ clear of the tail-pieces $i'$ $i'$ of the dogs I I, and the dogs engaging with the rod D prevent the latter from descending, and thereby lock the scale and prevent the weighing until it is unlocked by the insertion of the coin. When the coin is inserted at $f$, it passes down the chute K $k$ till it reaches the tumbler $r$, the latter being in the normal position shown in bold outline in Fig. 5. The weight of the coin $s$ instantly depresses the long arm of the tumbler-lever $r$, as shown in dotted outline in Fig. 5, and causes the shorter arm of the said lever and the attached rod $g$ to rise and to thereby lift the arm $q^2$ of the windlass-retaining pawl $q$, and so lift the said pawl, which in its turn lifts the winding-pawl, being situated immediately below the latter. The windlass being thus liberated, as shown in Fig. 4*, the loaded end G' of the lever G is allowed to drop, and by the movement of that lever its pins $l'\,l'$ are caused to press the tail-pieces $i'\,i'$ of the dogs I I toward each other and throw the dogs out from the rod. The dropping of the loaded lever turns back the windlass, and as the windlass turns back the pin or projection $c$ on its ratchet-wheel moves away from the elbow-lever $c'$, and thus allows the said lever to move away from the loaded lever-arm $e'$ of the friction brake or stop, and so allows the said loaded arm to drop and throw off the brake-shoe $e^2$ from the disk $h^2$ on the fly-spindle and liberate the motor. The weighing-machine now being unlocked, the person or body to be weighed gets or is placed on the platform and the rod D is caused to operate the index, as in an ordinary scale. The windlass makes less than a whole revolution backward under the influence of the loaded lever, and is then stopped by its arm $m^4$ coming against the stop-pin $m^5$, as shown in Fig. 4*. The time which the dogs remain disengaged is, however, very short, for the coin, after depressing the tumbler-lever $r'$, quickly rolls down the said lever and out of the opening at 10 in the lower part of the chute, whence it is collected through a conductor, 11, into a box, 12, or passes off in any way to a suitable receptacle. After the coin leaves the long arm of the tumbler-lever $r$, the latter is returned to its normal position by the weight of the rod $g$ and parts therewith connected, and the parts are allowed to fall into gear with the ratchet-wheel of the windlass, so that the motor again turns the windlass in the direction to draw up the loaded end of the lever G and release the dogs from the pins $l'\,l'$ on said lever, and so leave them free to fall back again in contact with the rod D. The dogs remain thus in contact with the rod while the load remains on the scale and after the removal of the load, allowing the rod to rise after the removal of the load, but preventing the possibility of the descent of the rod to repeat the weighing until another coin has been inserted at $f$ to produce the disengagement of the windlass from the motor and permit the loaded lever G to again throw them out from the rod.

It will thus be understood that one person cannot get off the platform and permit another to be weighed without again unlocking the machine by a coin. Not only is this the case, but it is impossible to weigh a second person, whether heavier or lighter than the first, who gets on the platform before the first gets off, for the additional weight of the second will produce a further descent of the platform and carry the index to a position to indicate the sum of the weight of the two, and if one should get off ever so gently the very lively recoil of the counterbalancing-springs $d$ cannot fail to bring back the platform and index to positions beyond those due to the weight of the person remaining on the platform. On the subsidence of the action of the recoil the descent of the platform due to the weight of the person on it would be prevented by the action of the dogs I I on the rod D, for although these dogs permit the free upward movement of the rod, they most effectually prevent any downward movement.

I will now describe the means by which the coin-opening $f$ is kept closed when there is a load on the platform of the machine.

Referring to Figs. 5 and 5*, $u$ is a shutter consisting of a thin flat plate which is capable of working between the mouth of the chute and the front part of the case A', in which the coin-opening $f$ is provided. This shutter constitutes the front part of a frame, $u'$, which surrounds the upper part of the coin-chute, and is so pivoted thereto at $u^2$ as to be very nearly balanced, the portion at the back of the pivots $u^2$ being just so much heavier than the portion in front, including the shutter, that it will, when left free, just hold the shutter up between the chute and the opening $f$ and against a small stop-piece, $u^3$, provided on the front of the chute. The rear portion of this frame is connected by a spring, $v'$, with a lever, $v$, which is pivoted at $v^2$ to a bracket, $v^3$, secured to the back part of the coin-chute. From this lever there hangs a rod, $w$, having a shoulder or collar, $w'$, at its lower end, which occupies a position above a projection, $w^2$, on the connecting-rod D. When the machine is unloaded and the rod D is in its highest position, the index being at zero, the projection $w^2$ presses upward against the collar $w'$, and so presses up the lever $v$, and with it the rear part of the frame $u'$, as to depress the shutter $u$ below the opening $f$, as shown in Figs. 5 and 5*, leaving the latter open to receive the coin; but when the rod is depressed in a very small degree by a load on the machine the projection $w^2$ leaves the lever $v$ free to drop and the weight of the back part of the frame $u'$, assisted by the weight of the lever $v$ and rod $w$, produces the closing of the shutter. A stop-pin, $u^4$, on the side of the chute, under the frame $u'$, limits the downward movement of the shutter, which only moves between the stops $u^3\,u^4$, and the spring-connection $v'$ between the lever $v$ and the frame $u'$ reduces the vibratory or tremulous movement of the shutter which results from the vibration of the springs $d\,d$ when the scale first receives the load or is first unloaded. Either the collar $w'$ or the projection $w^2$ should be adjustable up and down to insure the exact operation of the shutter. The collar $w'$ is shown thus adjustable by being screwed onto the rod $w$.

What I claim as my invention, and desire to secure by Letters Patent, is—

1. The combination, in a weighing-machine, with the platform and index and a connection between them, of an automatic arresting device for arresting said connection both at the zero position and in the position to which it is brought in weighing, a motor for controlling the operation of said arresting device, a stop for said motor, a tumbler or lever for receiving a coin, and a connection between said tumbler and stop, all substantially as herein described, for effecting the temporary liberation of the motor to permit the temporary disengagement of said arresting device by the weight of the coin, as herein set forth.

2. The combination of the connecting-rod D, dogs I I, the loaded disengaging-lever G, the windlass $m$, and chain or cord $m'$, for operating said lever, a motor for operating said windlass, a stop for said motor, the tumbler-lever $r$, for receiving the coin, and connections, substantially as herein described, between said tumbler-lever and the said stop and motor, whereby the weight of the coin is made to liberate the windlass from the motor and disengage the motor from its stop, all substantially as herein set forth.

3. The combination of the connecting-rod D, the arresting-dogs I I, the loaded disengaging-lever G, the cord or chain $m'$, the windlass $m$ and its ratchet-wheel $m^3$ and stop-pawl $q$, a motor furnished with a pawl, $o$, for operating said windlass, the tumbler-lever $r$, for receiving the weight of a coin, and the connection $g$ between the tumbler-lever and the pawl $o$, whereby the pawls $q$ and $o$ are caused to be removed from the ratchet-wheel by the weight of the coin, substantially as herein described.

THEODORE A. WEBER.

Witnesses:
 FREDK. HAYNES,
 J. W. ROE.